US006633554B1

United States Patent
Dalal (10) Patent No.: US 6,633,554 B1
(45) Date of Patent: Oct. 14, 2003

(54) SYSTEM AND METHOD FOR SOFT HANDOFF SETUP DURING SYSTEM ACCESS IDLE HANDOFF IN A WIRELESS NETWORK

(75) Inventor: Neerav N. Dalal, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/144,672

(22) Filed: Sep. 1, 1998

(51) Int. Cl.[7] ............................................... H04Q 7/00
(52) U.S. Cl. ....................... 370/331; 370/335; 370/342; 370/479; 455/438; 455/442
(58) Field of Search ................................. 370/320, 328, 370/331, 338, 332, 335, 342, 479; 375/130, 140, 200; 455/436, 439, 442, 438

(56) References Cited

U.S. PATENT DOCUMENTS

| | | | | |
|---|---|---|---|---|
| 5,101,501 A | * | 3/1992 | Gilhousen et al. ............. 455/33 |
| 5,594,718 A | * | 1/1997 | Weaver et al. ............... 370/331 |
| 5,640,414 A | * | 6/1997 | Blakeney, II et al. ....... 375/200 |
| 5,854,785 A | * | 12/1998 | Willey ........................ 370/332 |
| 5,920,550 A | * | 7/1999 | Willey ........................ 370/332 |
| 6,021,122 A | * | 2/2000 | Tiedemann, Jr. ............. 370/331 |
| 6,101,179 A | * | 8/2000 | Soliman ...................... 370/342 |
| 6,216,004 B1 | * | 4/2001 | Tiedemann et al. ......... 455/442 |
| 6,233,456 B1 | * | 5/2001 | Schiff et al. ................ 455/439 |

* cited by examiner

Primary Examiner—Huy D. Vu
Assistant Examiner—Tri H. Phan (57) ABSTRACT

There is disclosed, for use in a CDMA wireless network, a base station capable of performing a soft handoff of a mobile station while the mobile station is still in the process of first accessing the wireless network. The base station comprises a receiver for receiving from the mobile station a system access message that initiates in the wireless network a system access procedure that establishes a communications channel between the mobile station and the CDMA-based wireless network. The base station also comprises a handoff controller, coupled to the receiver and receiving the system access message therefrom. The handoff controller prepares another selected base station in the CDMA-based wireless network to take control over the system access procedure by sending a handoff control message that initiates in the selected base station a handoff procedure capable of assuming control over the system access procedure. This handoff procedure is speculatively initiated in anticipation of a later handoff by the mobile station.

20 Claims, 4 Drawing Sheets

SYSTEM AND METHOD FOR SOFT HANDOFF SETUP DURING SYSTEM ACCESS IDLE HANDOFF IN A WIRELESS NETWORK

TECHNICAL FIELD OF THE INVENTION

The present invention is directed, in general, to wireless networks and, more specifically, to a system for performing an idle handoff of a mobile unit between base stations during a system access in a CDMA wireless network.

BACKGROUND OF THE INVENTION

In 1996, more than 75 million people worldwide used cellular telephones. Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

Wireless subscribers use a wide variety of wireless devices, including cellular phones, personal communication services (PCS) devices, and wireless modem-equipped personal computer (PCs), among others. The large number of subscribers and the many applications for wireless communications have created a heavy subscriber demand for RF bandwidth. To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

Although TDMA-based wireless networks were developed on a large scale first, CDMA-based wireless networks are now also widely used. As is well known, CDMA systems divide the RF spectrum into a number of wideband digital radio signals. Each digital radio signal carries several different coded "channels". Each coded channel is distinguished by a unique pseudo-random noise (PN) code used by the mobile station and/or the base station. In a CDMA receiver, the coded channels are decoded by a signal correlator that matches PN sequences. Some coded channels are used as data traffic channels to transport subscriber voice and/or data signals, while other coded channels are used as control channels, including pilot, synchronization, paging and access channels. Some CDMA systems may use an analog control channel to allow a subscriber's wireless device (or mobile station) to access the CDMA system.

When a mobile station accesses a base station in a CDMA wireless network, the CDMA control channel (which has one unique PN code) assigns the mobile station to a data traffic channel (which has a different PN code) on which the mobile station exchanges data traffic with another party, a data terminal, a fax machine, or the like. Typically, the coded control channel and the data traffic channel(s)s used by the mobile station and the base station are on the same RF carrier frequency. Advantageously, in many CDMA networks, the control channels and the data traffic channels are on the same RF carrier frequency in all cells (i.e., base station coverage areas) in the networks.

Because adjoining base stations in the CDMA network are operating on the same RF carrier frequency, a mobile station can simultaneously access two (or more) base stations by using the same PN codes to communicate in data traffic channels and control channels with each base station. This enables a process known as "soft handoff" to occur when a mobile station communicating with a first base station enters a second base station's cell site. A soft handoff may occur while a mobile station is actively communicating with another device (e.g., a voice phone call). A soft handoff also may occur when the mobile station is turned "ON" and has accessed the CDMA network, but is not actively communicating with another device. This is known as an "idle" handoff.

In a CDMA wireless network, call setup failures frequently occur due to very quick propagation environment changes, such as when a mobile station moves behind a hill or a large building. This can cause problems when the mobile station is in the middle of a system access operation. For example, when a mobile station sends an Origination message to a first base station or receives a Page message from that first base station, the mobile station enters a "system access" state during which the mobile station cannot undergo a handoff to a second base station. If the RF propagation environment changes quickly enough, the mobile station may not receive a channel assignment message from the first base station and the data traffic channel will not be set up. In conventional CDMA networks, the mobile station cannot be put into a soft handoff at the time of initial channel assignment. A soft handoff setup is initiated only after a mobile station is assigned to a traffic channel and is sending a Pilot Strength Measurement message to the network. As a result, the attempted set up process with the first base station and all related messages are lost, and the mobile station must start over with another base station.

There is therefore a need in the art for improved CDMA wireless networks that allow a mobile station to perform an idle handoff while in a system access state in order to reduce the number of lost messages caused by changes in the RF propagation environment. In particular, there is a need in the art for improved CDMA systems that more rapidly initiate a soft handoff procedure for a mobile station to thereby reduce the call setup failure rate of the CDMA network. More particularly, there is a need for CDMA systems that can initiate a handoff procedure without waiting for a Pilot Strength Measurement message from the mobile station.

SUMMARY OF THE INVENTION

To address the above-discussed deficiencies of the prior art, it is a primary object of the present invention to provide, for use in a CDMA wireless network, a base station capable of wirelessly communicating with a mobile station. According to one embodiment of the base station comprises a receiver capable of receiving a system access message transmitted by the mobile station, wherein the system access message initiates in the wireless network a system access procedure operable to establish a communications channel between the mobile station and the CDMA-based wireless network. The base station also comprises a handoff controller, coupled to the receiver and receiving the system access message therefrom, the handoff controller capable of transferring control over the system access procedure from the base station to a first selected base station in the CDMA-based wireless network, wherein the handoff controller sends to the first selected base station a handoff control message operable to initiate in the first selected base station a handoff procedure capable of assuming control over the system access procedure.

The present invention therefore introduces the novel concept of speculatively initiating a handoff procedure to another base station without waiting for a message from the mobile station that initiates the handoff procedure. This allows a handoff procedure to be performed more rapidly and allows the handoff procedure to be initiated while the mobile station is still in a system access state, rather than in a conversation state.

In one embodiment of the present invention, the system access message comprises signal strength indicia indicating a strength of at least one signal transmitted by at least one base station in the wireless network.

In another one embodiment of the present invention, the handoff controller sends the handoff control message to the first selected base station in response to a signal strength indicia in the system access message corresponding to a signal transmitted by the first selected base station.

In still another embodiment of the present invention, the handoff controller sends to the first selected base station a channel assignment control message, the channel assignment control message causing the first selected base station to transmit to the mobile station a first channel assignment message assigning the mobile station to operate in a selected data traffic channel.

In yet another embodiment of the present invention, the base station transmits a second channel assignment message to the mobile station assigning the mobile station to operate in the selected data traffic channel.

In yet still another embodiment of the present invention, the handoff controller sends to each of a plurality of selected base stations a handoff control message operable to initiate in the each of the plurality of selected base stations a handoff procedure capable of assuming control over the system access procedure.

In a further embodiment of the present invention, the handoff controller sends to each of a plurality of selected base stations a channel assignment control message, the channel assignment control message causing the each of the plurality of selected base stations to transmit to the mobile station a channel assignment message assigning the mobile station to operate in a selected data traffic channel.

In a still further embodiment of the present invention, the base station transmits a channel assignment message to the mobile station assigning the mobile station to operate in the selected data traffic channel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged CDMA wireless network.

Figure 1:
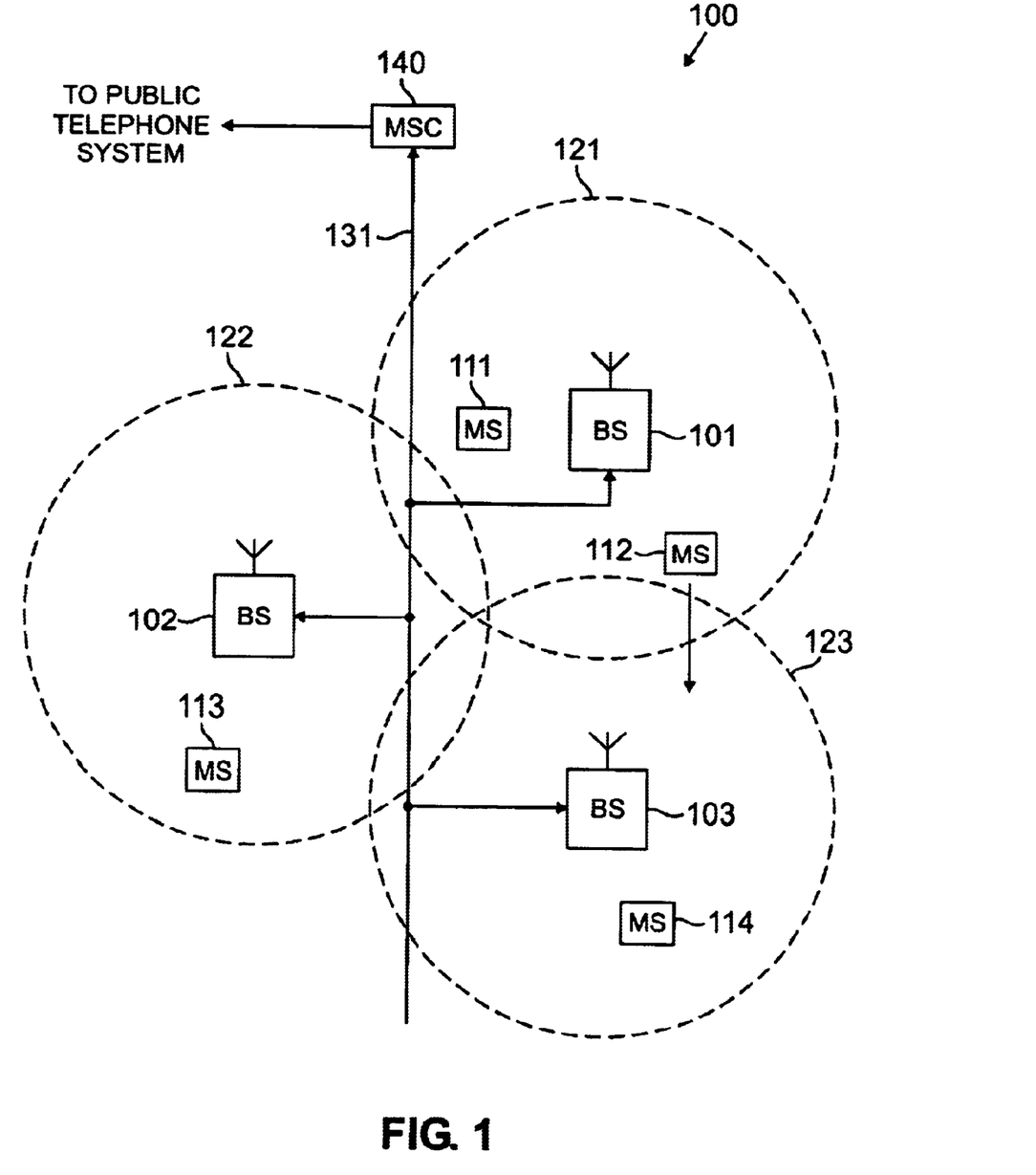
FIG. 1 illustrates an exemplary CDMA wireless network according to one embodiment of the present invention.

FIG. 1 illustrates an exemplary CDMA wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
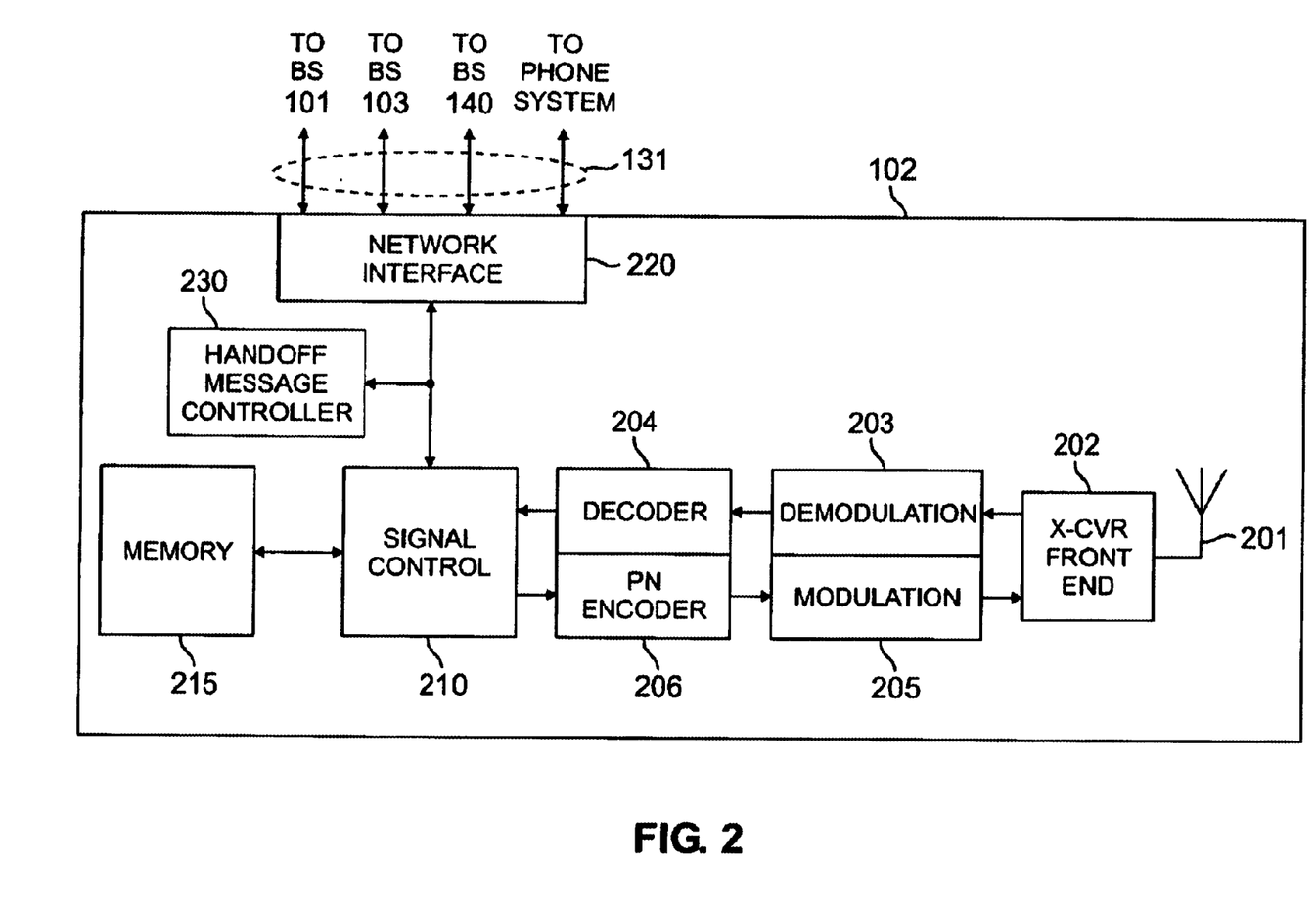
FIG. 2 is a block diagram illustrating in greater detail an exemplary base station in the CDMA wireless network in FIG. 1 according to one embodiment of the present invention.

FIG. 2 is a block diagram illustrating in greater detail an exemplary base station (BS) 102 in CDMA wireless network 100 according to one embodiment of the present invention. BS 102 comprises an antenna 201, transceiver front end circuitry 202, demodulation circuitry 203 and modulation circuitry 205. Transceiver front end circuitry 202 contains low-noise amplification circuitry for amplifying reverse channel RF signals received by antenna 201. The amplified reverse channel RF signals are demodulated by demodulation circuitry 203, thereby recovering the baseband data traffic or control message signal that was sent in the reverse channel by one or more of the mobile stations. Modulation circuitry 205 receives data traffic and control messages from pseudo-random noise (PN) encoder 206 and modulates these signals to produce a modulated forward channel RF signal. Transceiver front end circuitry 202 also contains power amplifiers for amplifying the modulated forward channel RF signals received from modulation circuitry 205.

Within BS 102, signal controller 210 controls the flow of data traffic messages and control messages sent and received by transceiver front end circuitry 202. Signal controller 210 is coupled to memory 215, which may be used to hold data traffic and control messages and to store the operating program executed by signal controller 210.

Signal controller 210 receives voice and/or data traffic destined for a mobile station from other base stations or the public phone system via communications line 131 and network interface 220. Signal controller 210 sends these "baseband" signals received from communications line 131 to PN encoder 206, which encodes and thereby spreads the baseband signal with a pseudo-random noise sequence, according to conventional CDMA techniques. The spread baseband signal is then modulated on a carrier wave by modulation circuit 205.

Signal controller 210 also receives an incoming baseband information signal from decoder 204. The input to decoder 204 is a spread baseband signal that has been demodulated by demodulation circuit 203. Decoder 204 essentially reverses the spreading function performed by a PN encoder in the transmitting mobile station based to thereby produce a "de-spread" baseband signal that contains voice/data traffic and command messages received from one or more mobile stations. The received voice/data traffic may then be transferred by signal controller 210 to other base stations, to a server, or to the public phone system via communications line 131 and network interface 220.

BS 102 also comprises handoff message controller 230, which is responsible for controlling hand-offs, including idle handoffs during an access state operation, in accordance with the principles of the present invention. In an advantageous embodiment of the present invention, when a base station receives an origination message from a mobile station, handoff message controller 230 allows the receiving (or source) base station to initiate an inter-base station soft handoff setup any time after an origination message is received. Additionally, in a CDMA network according to the present invention, multiple traffic channels are set up using an enhanced Inter-Base Station Channel Assignment message (IBSCAM) sent by the source base station to other base stations.

Figure 3:
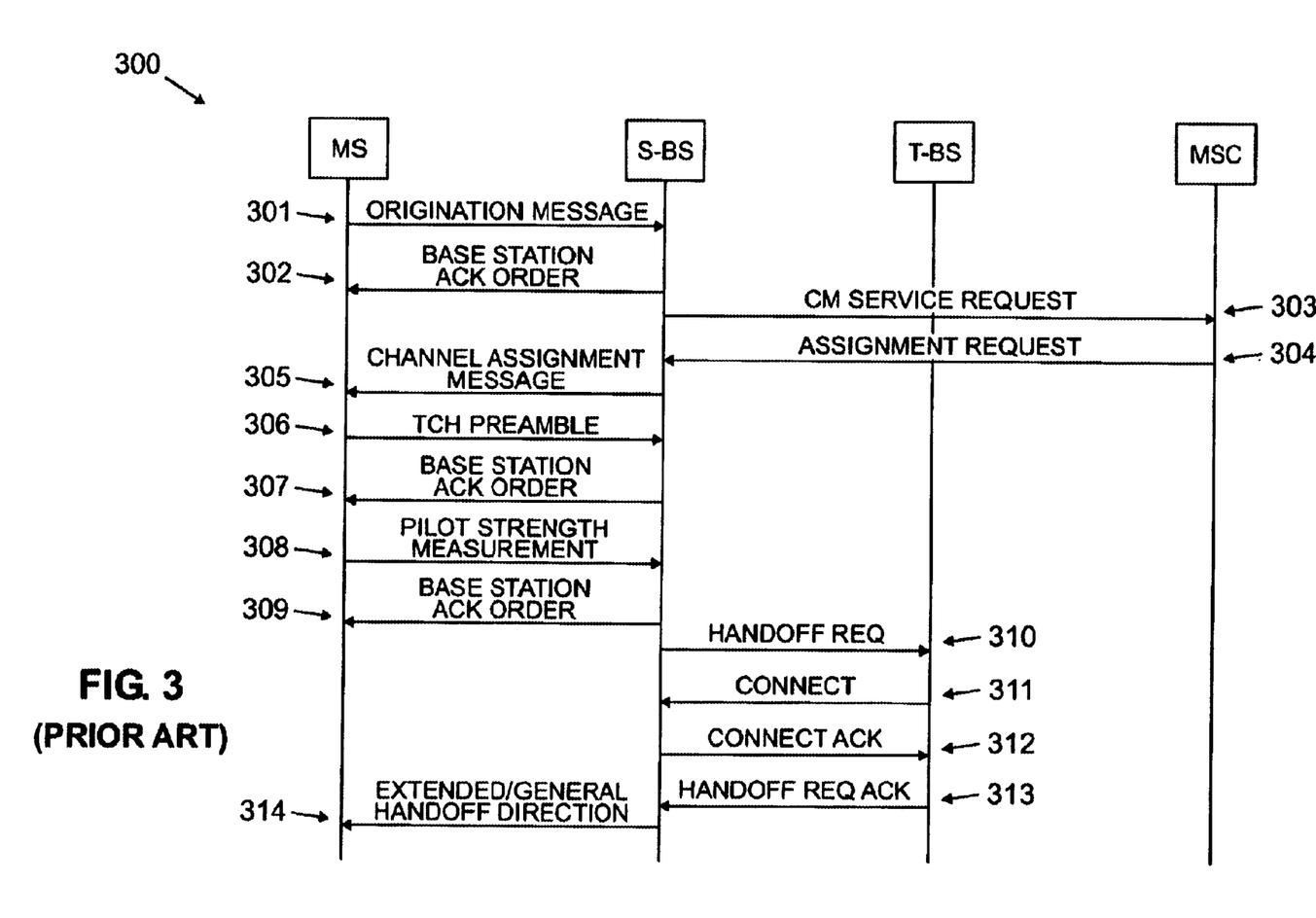
FIG. 3 is a message flow diagram illustrating the operation of bases stations in a CDMA wireless network in accordance with the prior art.

In order to more fully understand the operation of the present invention, a conventional soft handoff setup procedure will first be described. FIG. 3 is a message flow diagram 300 illustrating the operation of prior art base stations in a CDMA wireless network. In the scenario depicted in FIG. 3, control messages are exchanged between a mobile station (MS) and two base stations, a source base station (S-BS) and a target base station (T-BS), via the air interface. Control messages are also exchanged between the source base station and the target base station, and between the source base station and the mobile switching center (MSC) controlling the source base station and the target base station, via communications line 131.

The mobile station initiates an access attempt by transmitting an Origination message to the source base station (process step 301) and the source base station responds by transmitting a Base Station Acknowledgment Order to the source base station (process step 302). The source base station also sends a CM Service Request message to the mobile switching center (process step 303), which responds by sending the source base station an Assignment Request message (process step 304).

Next, the source base station sends a Channel Assignment message to the mobile station (process step 305) that assigns the mobile station particular PN codes for sending and receiving voice/data in the data traffic channels. The mobile station then transmits a traffic channel (TCH) preamble to the source base station (process step 306), which responds by sending a Base Station Acknowledgment Order message to the mobile station (process step 307). The mobile station also measures the strength(s) of the pilot channel signal(s) transmitted by various base station(s) in the vicinity and transmits a Pilot Strength Measurement signal to the source base station reporting the strength(s) of the received pilot channel signal(s) (process step 308). Again, the source base station responds by sending a Base Station Acknowledgment Order message to the mobile station (process step 309).

When the strength of a pilot channel signal of a target base station becomes strong, the source base station transmits a Handoff Request message via communication line 131 to the target base station (process step 310) in order to initiate a soft handoff of the mobile station. The target base station transmits a Connect message to the source base station (process step 311), which responds by sending a Connect Acknowledgment message to the target base station (process step 311). After the target base station sends a Handoff Request Acknowledgment Message to the source base station (process step 313), the source base station sends an Extended/General Handoff Direction message in the traffic channel to the mobile station, causing the mobile station to communicate also with the target base station thereafter (process step 314).

Many of the messages in the above-described protocol are lost if the mobile station fails to receive the Base Station Acknowledgment Order message in process step 302 from the source base station due to a sudden change in the RF propagation environment. Instead, the mobile station attempts to access the wireless network 100 using one or more other base stations and the process is restarted.

To overcome the difficulties posed by sudden changes in the RF propagation environment during the system access state, the present invention introduces a modified protocol that provides a mobile station with a more reliable method for accessing wireless network 100.

The mobile station transmits on the access control channel using a random access procedure (an "access probe"). The term "access attempt" describes the entire process of sending a message and receiving (or failing to receive) an acknowledgment for that message. The term "access sub-attempt" describes the portion of an access attempt that begins when the mobile station begins to transmit access probes in response to one pilot channel and ends when the mobile station either performs an access probe handoff or receives an acknowledgment for that message.

In order to reduce call setup failure in the system access state (i.e., between the start of an access attempt and the initiation of conversation state), the present invention provides three idle hand-offs for the system access state:

1. Access Entry Handoff: A handoff that transfers reception of the paging channel from one base station to another, when the mobile station is transitioning from the mobile station idle state to the system access state. Access entry handoff occurs before sending a first access probe. For example, an access entry handoff may occur when the mobile station receives a Page message from one base station cell site and moves to another base station cell site before sending a Page Response message.

2. Access Probe Handoff: A handoff that occurs while the mobile station is performing an access attempt in the system access state. An access probe handoff occurs between access sub-attempts but before receiving the Base Station Acknowledgment Order message from the base station. This may result in more than one base station processing the Origination message for the same mobile station. The Origination message from the mobile station carries a Pilot Report field (similar to the Pilot Strength Measurement Message), in which the mobile station identifies which base stations are sending pilot control channel signals that are strongly received by the mobile station. These base stations are likely candidates for a soft handoff procedure.

3. Access Handoff: A handoff that transfers reception of the paging channel from one base station to another, when the mobile station is in the system access state after an access attempt. After receiving the Base Station Acknowledgment Order Message and before receiving a Channel Assignment message or an Extended Channel Assignment Message (CAM or ECAM), the mobile station may perform an idle handoff to another base station while in the system access state (i.e., before entering into conversation state). The likely target base stations are listed in the Pilot Report field of the Origination message from the mobile station.

The present invention enhances the setup of an inter-base station soft handoff by allowing the source base station to put the mobile station in the soft handoff as soon as possible (at the time of initial channel assignment). The present invention also enhances the setup of an inter-base station soft handoff by allowing the source base station to cause one or more target base stations to send the CAM/ECAM.

After receiving the Origination message from the mobile station, the source case station processes the Pilot Report field in the Origination message and initiates the setup of soft handoff procedures with appropriate target base stations using the existing Handoff Request message protocol. This allows the setup of one or more alternate traffic channels simultaneously with the normal call setup. This prepares the target base station(s) to be in soft handoff mode at the time of the traffic channel assignment.

After receiving the Assignment Request message from the mobile switching center and the Connect message from the target base station(s), a source base station according to the principles of the present invention sends an Inter-Base Station Channel Assignment message (IBSCAM) to one or more target base station(s) causing them to transmit an Extended Channel Assignment Message (ECAM) over the air interface to the mobile station. In this message, the source base station sends relevant information that is required to be included in the ECAM, such as Pilot PN, Code Channel and Power combining information of each base station that is included in the initial soft handoff setup. This allows one or more base stations to send the ECAM to the mobile station and increases the probability of delivering this message to the mobile station that is performing the access handoff in system access state.

The soft handoff procedure to the other potential target base stations can also be setup during the establishment of the call. The source BS decides what cells are to be setup in soft/softer handoff during the establishment of the call.

A Handoff Request message is sent from the source base station directly to the target base station(s) across communications line 131 to set up those base station cells for handling the call. The target base station(s) allocate and connect the appropriate resources and respond directly to the source base station using a Handoff Request Acknowledgment messages once all expected Connect Acknowledgment messages have been received.

The source base station also decides what target base station cells are likely candidates to which the mobile station may perform the access handoff. The source base station sends a special Extended Channel Assignment message (ECAM) to the target base stations to cause the target base stations to send an appropriate air interface ECAM message to assign the forward channels to the mobile station.

Figure 4:
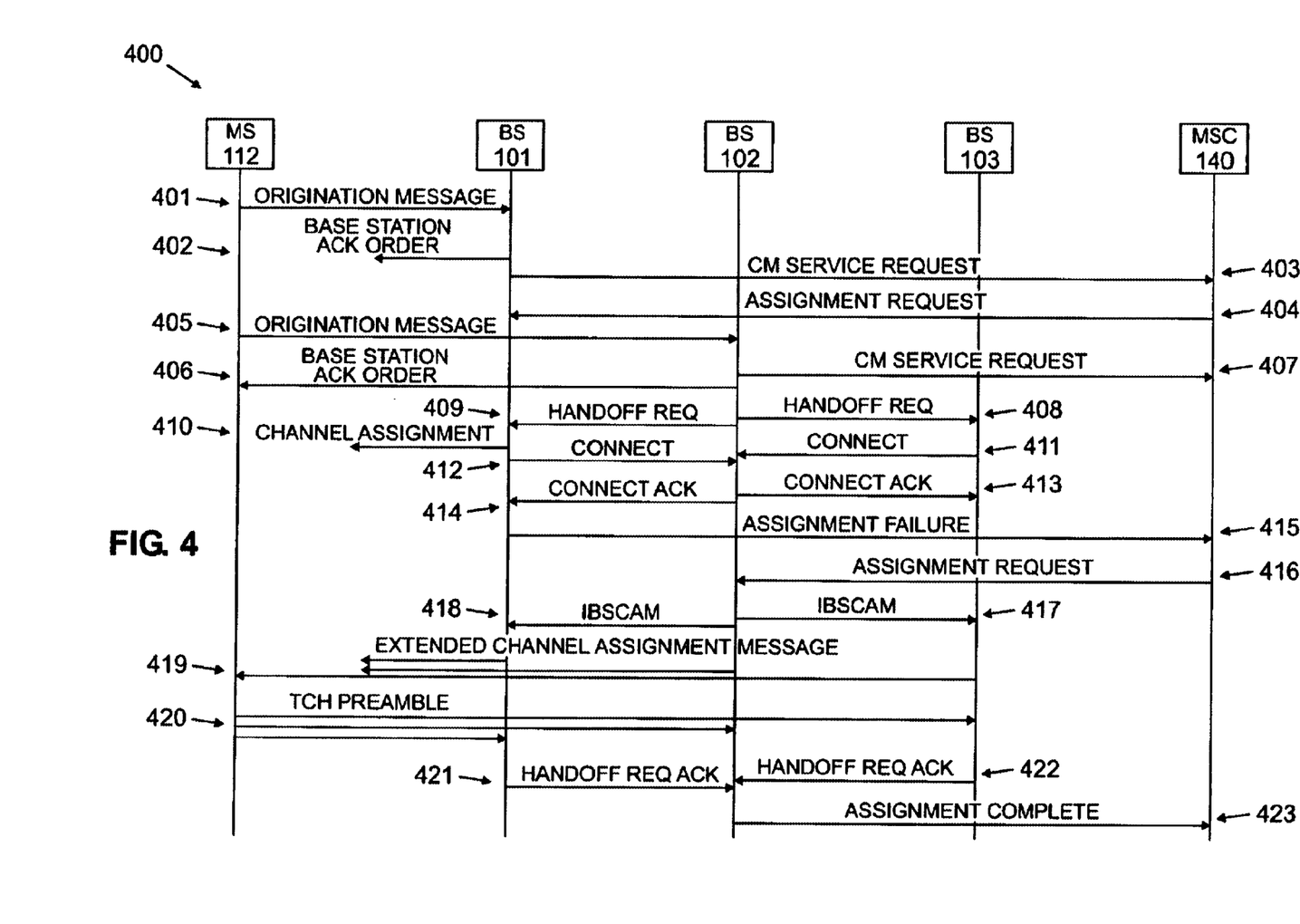
FIG. 4 is a message flow diagram illustrating the operation of exemplary bases stations in the CDMA wireless network in FIG. 1 according to one embodiment of the present invention.

FIG. 4 is a message flow diagram 400 illustrating the operation of exemplary bases stations in the CDMA wireless network 100 according to one embodiment of the present invention. In the illustrated scenario, the mobile station 112 attempts to access a first base station, BS 101, but fails due to RF propagation changes. MS 112 then accesses a second base station, BS 102, during an access probe attempt, but, before a traffic channel is established, MS 112 performs an access handoff to BS 103.

The system access handoff process begins when MS 112 transmits an Origination message with Network Layer 2 acknowledgment required, over the access channel of the air interface to BS 101 to request service (process step 401). BS 101 acknowledges the receipt of the Origination message by transmitting a Base Station Acknowledge Order message to MS 112 (process step 402). This message is either lost or MS 112 moves to another base station, BS 102, due to adverse propagation conditions.

Since BS 101 is unaware of the failure situation, it continues the call setup operation and transmits to mobile switching center 140 a CM Service Request message that is part of a network Layer 3 Information message (process step 403). In reply, MSC 140 sends an Assignment Request message to BS 101 to request assignment of radio resources in BS 101 (process step 404).

In the meantime, MS 112 initiates an access probe handoff by sending another Origination Message to BS 102 (process step 405). BS 102 acknowledges the receipt of the Origination message with a Base Station Acknowledge Order message to MS 112 (process step 406). BS 102 also transmits to mobile switching center 140 a CM Service Request message that is part of a network Layer 3 Information message (process step 407).

If the Pilot Report field of the Origination message sent from MS 112 to BS 102 identifies other strong pilot channel signals (i.e., BS 101 and BS 103 pilots are also strong), then BS 102 initiates the inter-base station soft handoff setup procedure by sending Handoff Request messages to the target base stations, in this case, BS 101 and BS 103 (process steps 408 and 409).

Since BS 101 is unaware that MS 112 has moved on to BS 102, BS 101 sends a Channel Assignment or Extended Channel Assignment Message to MS 112, but does not receive any reverse traffic frames from MS 112 (process step 410).

BS 101 and BS 103 each initiate a connection by sending a Connect message to BS 102 (process steps 411 and 412). Note that a single Handoff Request message may result in multiple connections being established, each using a separate Connect message. This example shows only a single connection being established. BS 102 replies with Connect Acknowledgment messages to complete the connections (process steps 413 and 414).

In the meantime, since BS 101 did not receive any reverse traffic frames from MS 112, it sends an Assignment Failure message to MSC 140 (process step 415). MSC 140 continues to process the call setup request from BS 102 and sends an Assignment Request message to BS 102 (process step 416). In actuality, MSC 140 may send the Assignment Request message at any time after BS 102 sends the CM service Request message in process step 407 above.

After receiving the Assignment Request message from MSC 140 and receiving Connect messages from BS 101 and BS 103, BS 102 sends inter-BS Channel Assignment messages (IBSCAM) to BS 101 and BS 103 (process steps 417 and 418). Next, some or all of BS 101, BS 102 and BS 103 transmit Extended Channel Assignment messages over the air interface to MS 112 (process step 419). The probability of MS 112 receiving at least one ECAM is substantially increased by sending ECAMs from multiple base stations.

In the meantime, MS 112 has performed an access handoff to BS 103. Since MS 112 is listening to the paging channel of only one base station (in this case, now BS 103), it does not receive the Extended Channel Assignment Messages from BS 101 and BS 102 but it does receive this message from BS 103. After receiving a Extended Channel Assignment Message from BS 103 and the forward traffic frames from one or more base stations, MS 112 starts sending traffic preambles (process step 420). At this time, MS 112 has been set up directly by the soft/softer handoff with one or more base stations.

BS 101 and BS 103 send Handoff Request Acknowledgment messages to BS 102 to complete the soft handoff setup procedure (process steps 421 and 422). Since BS 102 is the source base station, it receives the reverse traffic frames from MS 112 either directly or through BS 101 and/or BS 103. BS 102 then sends the Assignment Complete message to MSC 140 (process step 423). At this time, MS 112 is moved to traffic channel and the call setup is completed successfully.

Although the present invention has been described in detail, those skilled in the art should understand that they can make various changes, substitutions and alterations herein without departing from the spirit and scope of the invention in its broadest form.

What is claimed is:

1. For use in a CDMA-based wireless network, a base station capable of wirelessly communicating with a mobile station, said base station comprising:

a receiver capable of receiving a system access message transmitted by said mobile station, wherein said system access message initiates in said wireless network a system access procedure operable to establish a communications channel between said mobile station and said CDMA-based wireless network; and a handoff message controller in said base station, coupled to said receiver and receiving said system access message therefrom, said handoff message controller capable of transferring control over said system access procedure from said base station directly through a communication line to a first selected base station in said CDMA-based wireless network, wherein said handoff message controller sends to said first selected base station a handoff control message operable to initiate in said first selected base station a handoff procedure capable of assuming control over said system access procedure.

2. The base station set forth in claim 1 wherein said system access message comprises signal strength indicia indicating a strength of at least one signal transmitted by at least one base station in said wireless network.

3. The base station set forth in claim 2 wherein said handoff message controller sends said handoff control message to said first selected base station in response to a signal strength indicia in said system access message corresponding to a signal transmitted by said first selected base station.

4. The base station set forth in claim 1 wherein said handoff message controller sends to said first selected base station a channel assignment control message, said channel assignment control message causing said first selected base station to transmit to said mobile station a first channel assignment message assigning said mobile station to operate in a selected data traffic channel.

5. The base station set forth in claim 4 wherein said base station transmits a second channel assignment message to said mobile station assigning said mobile station to operate in said selected data traffic channel.

6. The base station set forth in claim 1 wherein said handoff message controller sends to each of a plurality of selected base stations a handoff control message operable to initiate in said each of said plurality of selected base stations a handoff procedure capable of assuming control over said system access procedure.

7. The base station set forth in claim 6 wherein said handoff message controller sends to each of a plurality of selected base stations a channel assignment control message, said channel assignment control message causing said each of said plurality of selected base stations to transmit to said mobile station a channel assignment message assigning said mobile station to operate in a selected data traffic channel.

8. The base station set forth in claim 7 wherein said base station transmits a channel assignment message to said mobile station assigning said mobile station to operate in said selected data traffic channel.

9. A CDMA-based wireless network comprising a plurality of base stations capable of wirelessly communicating with a mobile station, at least one of said plurality of base stations comprising:

a receiver capable of receiving a system access message transmitted by said mobile station, wherein said system access message initiates in said wireless network a system access procedure operable to establish a communications channel between said mobile station and said CDMA-based wireless network; and a handoff message controller in said at least one base station, coupled to said receiver and receiving said system access message therefrom, said handoff message controller capable of transferring control over said system access procedure from said at least one base station directly through a communication line to a second selected one of said plurality of base stations in said CDMA-based wireless network, wherein said handoff message controller sends to said second selected base station a handoff control message operable to initiate in said second selected base station a handoff procedure capable of assuming control over said system access procedure.

10. The CDMA-based wireless network set forth in claim 9 wherein said system access message comprises signal strength indicia indicating a strength of at least one signal transmitted by at least one transmitting base station in said wireless network.

11. The CDMA-based wireless network set forth in claim 10 wherein said handoff message controller sends said handoff control message to said second selected base station in response to a signal strength indicia in said system access message corresponding to a signal transmitted by said second selected base station.

12. The CDMA-based wireless network set forth in claim 9 wherein said handoff message controller sends to said second selected base station a channel assignment control message, said channel assignment control message causing said second selected base station to transmit to said mobile station a first channel assignment message assigning said mobile station to operate in a selected data traffic channel.

13. The CDMA-based wireless network set forth in claim 12 wherein said at least one base station transmits a second channel assignment message to said mobile station assigning said mobile station to operate in said selected data traffic channel.

14. The CDMA-based wireless network set forth in claim 9 wherein said handoff message controller sends to each of said plurality of base stations a handoff control message operable to initiate in said each of said plurality of base stations a handoff procedure capable of assuming control over said system access procedure.

15. The CDMA-based wireless network set forth in claim 14 wherein said handoff message controller sends to each of said plurality of base stations a channel assignment control message, said channel assignment control message causing said each of said plurality of base stations to transmit to said mobile station a channel assignment message assigning said mobile station to operate in a selected data traffic channel.

16. The CDMA-based wireless network set forth in claim 15 wherein said at least one base station transmits a channel assignment message to said mobile station assigning said mobile station to operate in said selected data traffic channel.

17. For use in a CDMA-based wireless network comprising a plurality of base stations capable of wirelessly communicating with a mobile station, a method of performing a handoff of the mobile station from a first base station to a second base station, the method comprising the steps of:

receiving a system access message transmitted by the mobile station in the first base station, wherein the system access message initiates in the wireless network a system access procedure operable to establish a communications channel between the mobile station and the CDMA-based wireless network; and in response to a receipt of the system access message in a handoff message controller in said first base station, sending to the second base station directly through a communication line a handoff control message operable to initiate in the second selected base station a handoff procedure capable of assuming control over the system access procedure.

18. The method set forth in claim 17 wherein an execution of the handoff procedure is performed by the second base station at least partially contemporaneously with an execution of the system access procedure performed by the first base station.

19. The method set forth in claim 17 comprising the further steps of sending to the second base station a channel assignment control message, the channel assignment control message causing the second base station to transmit to the mobile station a first channel assignment message assigning the mobile station to operate in a selected data traffic channel.

20. The method set forth in claim 19 wherein the first base station transmits a second channel assignment message to the mobile station assigning the mobile station to operate in the selected data traffic channel.

\* \* \* \* \*